(12) United States Patent
Mehlberg et al.

(10) Patent No.: US 7,758,820 B2
(45) Date of Patent: Jul. 20, 2010

(54) APPARATUS AND PROCESS FOR REGENERATOR MIXING

(75) Inventors: Robert L. Mehlberg, Wheaton, IL (US); Reza Mohammad Mostofi Ashtiani, Naperville, IL (US); Keith A. Couch, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 687 days.

(21) Appl. No.: 11/614,830

(22) Filed: Dec. 21, 2006

(65) Prior Publication Data

US 2008/0152562 A1   Jun. 26, 2008

(51) Int. Cl.
*B01D 50/00* (2006.01)

(52) U.S. Cl. ......................... 422/178; 502/34
(58) Field of Classification Search .................. 422/178; 502/34
See application file for complete search history.

(56) References Cited

U.S. PATENT DOCUMENTS

| | | | |
|---|---|---|---|
| 4,414,100 A | | 11/1983 | Krug et al. |
| 4,615,992 A | | 10/1986 | Murphy |
| 5,059,305 A | | 10/1991 | Sapre |
| 5,156,817 A | * | 10/1992 | Luckenbach ................ 422/144 |
| 5,248,408 A | | 9/1993 | Owen |
| 5,262,046 A | | 11/1993 | Forgac et al. |
| 5,773,378 A | | 6/1998 | Bussey et al. |
| 6,126,905 A | | 10/2000 | Wells |
| 6,680,030 B2 | | 1/2004 | Koebel et al. |
| 6,809,054 B1 | | 10/2004 | Myers et al. |
| 6,979,360 B1 | * | 12/2005 | Cetinkaya et al. ............. 95/271 |
| 7,026,262 B1 | | 4/2006 | Palmas et al. |
| 7,077,997 B1 | | 7/2006 | Sandacz |
| 2005/0019228 A1 | * | 1/2005 | Myers et al. ................ 422/139 |
| 2005/0261530 A1 | | 11/2005 | Stell |

FOREIGN PATENT DOCUMENTS

WO    WO 2005/080531    9/2005

OTHER PUBLICATIONS

Keith A. Couch, et al., "Controlling FCC Yields and Emissions UOP Technology for a Changing Environment" NPRA Annual Meeting paper, Mar. 23-25, 2003.
Frank S. Rosser, et al., "Integrated View to Understanding the FCC NOx Puzzle" AIChE Annual Meeting paper, 2004.

* cited by examiner

*Primary Examiner*—Edward M Johnson
(74) *Attorney, Agent, or Firm*—James C Paschall

(57) ABSTRACT

Apparatus and process is provided for increasing mixing in a regenerator. Streamlines of gas and some catalyst may form in a regenerator as a result of cyclone inlet horns positioned in the same direction. Overall mixing in the regenerator may decrease because of these streamlines. A dampening device may be used to interrupt the streamlines and increase mixing in the regenerator. The dampening device may be a baffle and direct streamlines from the outside of the chamber toward the center to collide and mix. In another embodiment, a dampening device may be a secondary disengager such as a T-disengager or an inverted can arrangement that may discharge gas and catalyst near the center of the upper chamber and interrupt the streamlines. In another embodiment, a dampening device may have swirl arms that redirect stream lines counter to the direction of flow.

18 Claims, 4 Drawing Sheets

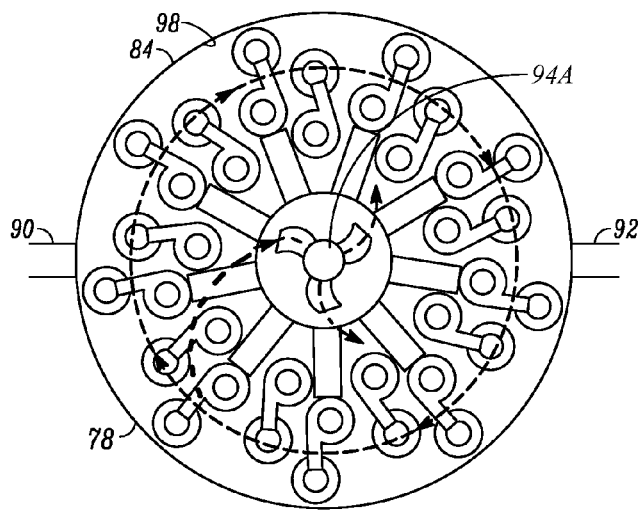
*FIG. 2*
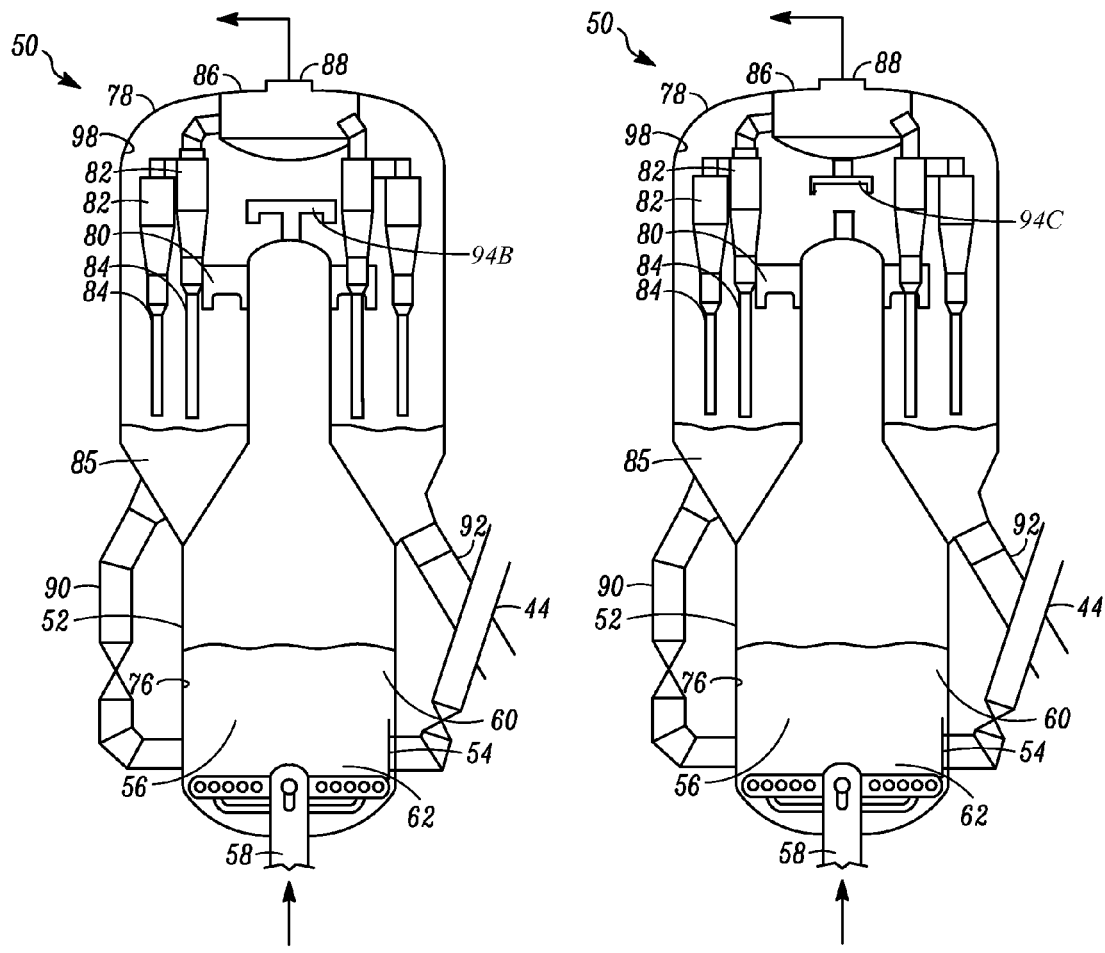
*FIG. 3*  *FIG. 4*

APPARATUS AND PROCESS FOR REGENERATOR MIXING

BACKGROUND OF THE INVENTION

1. Field of the Invention

This invention relates generally to apparatus and processes in fluid catalytic cracking (FCC). More specifically, this invention relates to increasing the mixing in regenerators.

2. Description of the Prior Art

Fluid catalytic cracking, as well as Resid FCC(RFCC), is a catalytic conversion process for cracking heavy hydrocarbons into lighter hydrocarbons by bringing the heavy hydrocarbons into contact with a catalyst composed of finely divided particulate material. Most FCC units use zeolite-containing catalyst having high activity and selectivity.

The basic components of the FCC reactor section include a riser, a reactor vessel, a catalyst stripper, and a regenerator. In the riser, a feed distributor inputs the hydrocarbon feed which contacts the catalyst and is cracked into a product stream containing lighter hydrocarbons. Catalyst and hydrocarbon feed are transported upwardly in the riser by the expansion of the lift gases that result from the vaporization of the hydrocarbons, and other fluidizing mediums, upon contact with the hot catalyst. Steam or an inert gas may be used to accelerate catalyst in a first section of the riser prior to or during introduction of the feed. Coke accumulates on the catalyst particles as a result of the cracking reaction and the catalyst is then referred to as spent catalyst. The reactor vessel disengages spent catalyst from product vapors. The catalyst stripper removes absorbed hydrocarbon from the surface of the catalyst. The regenerator removes the coke from the catalyst and recycles the regenerated catalyst into the riser.

The spent catalyst particles are regenerated before catalytically cracking more hydrocarbons. Regeneration occurs by oxidation of the carbonaceous deposits to carbon oxides and water. The spent catalyst is introduced into a fluidized bed at the base of the regenerator, and oxygen-containing combustion air is passed upwardly through the bed. After regeneration, the regenerated catalyst is returned to the riser.

Oxides of nitrogen ($NO_X$) are usually present in regenerator flue gases but should be minimized because of environmental concerns. Regulated $NO_X$ emissions generally include nitric oxide (NO) and nitrogen dioxide ($NO_2$), but the FCC process can also produce $N_2O$. In an FCC regenerator, $NO_X$ is produced almost entirely by oxidation of nitrogen compounds originating in the FCC feedstock and accumulating in the coked catalyst. At FCC regenerator operating conditions, there is negligible $NO_X$ production associated with oxidation of $N_2$ from the combustion air. Production of $NO_X$ is undesirable because it reacts with volatile organic chemicals and sunlight to form ozone.

The two most common types of FCC regenerators in use today are a combustor style regenerator and a bubbling bed regenerator. Bubbling bed and combustor style regenerators may utilize a CO combustion promoter comprising platinum for accelerating the combustion of coke and CO to $CO_2$. The CO promoter decreases CO emissions but increases $NO_X$ emissions in the regenerator flue gas.

The combustor regenerator has a vessel, a combustor, that burns nearly all the coke to $CO_2$ with little or no CO promoter and with low excess oxygen. The vessel has a highly back-mixed fast fluidized bed. A portion of the hot regenerated catalyst from the upper regenerator is recirculated to the lower combustor to heat the incoming spent catalyst and to control the combustor density and temperature for optimum coke combustion rate. As the catalyst and flue gas mixture enters the combustor riser, the velocity is further increased and the two-phase mixture exits through symmetrical down-turned disengager arms into an upper chamber of the vessel. The upper chamber separates the catalyst from the flue gas with the disengager arms followed by cyclones and return it to the catalyst bed which supplies hot regenerated catalyst to both the riser reactor and combustor below. The regenerated catalyst recycling provides heat to accelerate the combustion of the lower phase of catalyst. Combustors are advantageous because of their efficient oxygen requirements.

A bubbling bed regenerator carries out the coke combustion in a dense fluidized bed of catalyst. Fluidizing combustion gas forms bubbles that ascend through a discernible top surface of a dense catalyst bed. Only catalyst entrained in the gas exits the reactor with the vapor. Cyclones above the dense bed separate the catalyst entrained in the gas and return it to the catalyst bed. The superficial velocity of the fluidizing combustion air is typically less than 1.2 m/s (4 ft/s) and the density of the dense bed is typically greater than 480 kg/m$^3$ (30 lb/ft$^3$) depending on the characteristics of the catalyst. The mixture of catalyst and vapor is heterogeneous with pervasive vapor bypassing of catalyst. The temperature will increase in a typical bubbling bed regenerator by about 17° C. (about 30° F.) or more from the dense bed to the cyclone outlet due to combustion of CO in the dilute phase. The flue gas leaving the bed may have about 2 mol-% CO. This CO may require about 1 mol-% oxygen for combustion. Assuming the flue gas has 2 mol-% excess oxygen, there will likely be 3 mol-% oxygen at the surface of the bed and higher amounts below the surface. Excess oxygen is not desirable for low $NO_X$ operation.

Refiners often use CO promoter (equivalent to 0.5 to 3 ppm Pt inventory) to control afterburn at the low excess $O_2$ required to control $NO_X$ at low levels. While low excess $O_2$ reduces $NO_X$, the simultaneous use of Pt CO promoter often needed for afterburn control can more than offset the advantage of low excess $O_2$.

The superficial velocity of the combustion gas is typically less than 1.2 m/s (4.2 ft/s) and the density of the dense bed is typically greater than 640 kg/m$^3$ (40 lb/ft$^3$) depending on the characteristics of the catalyst. The mixture of catalyst and combustion gas is heterogeneous with pervasive gas bypassing of catalyst.

The dilute transport flow regime is typically used in FCC riser reactors. In transport flow, the difference in the velocity of the gas and the catalyst is relatively low with little catalyst back mixing or hold up. The catalyst in the reaction zone maintains flow at a low density and very dilute phase conditions. The superficial gas velocity in transport flow is typically greater than 2.1 m/s (7.0 ft/s), and the density of the catalyst is typically no more than 48 kg/m$^3$ (3 lb/ft$^3$). The density in a transport zone in a regenerator may approach 80 kg/m$^3$ (5 lb/ft$^3$). In transport mode, the catalyst-combustion gas mixture is homogeneous without gas voids or bubbles forming in the catalyst phase.

Intermediate of dense, bubbling beds and dilute transport flow regimes are turbulent beds and fast fluidized regimes. In a turbulent bed, the mixture of catalyst and combustion gas is not homogeneous. The turbulent bed is a dense catalyst bed with elongated voids of combustion gas forming within the catalyst phase and a less discernible surface. Entrained catalyst leaves the bed with the combustion gas, and the catalyst density is not quite proportional to its elevation within the reactor. The superficial combustion gas velocity is between about 1.1 and about 2.1 m/s (3.5 and 7 ft/s), and the density is typically between about 320 and about 640 kg/m$^3$ (20 and 40 lb/ft$^3$) in a turbulent bed.

Fast fluidization defines a condition of fluidized solid particles lying between the turbulent bed of particles and complete particle transport mode. A fast fluidized condition is characterized by a fluidizing gas velocity higher than that of a dense phase turbulent bed, resulting in a lower catalyst density and vigorous solid/gas contacting. In a fast fluidized zone, there is a net transport of catalyst caused by the upward flow of fluidizing gas. The catalyst density in the fast fluidized condition is much more sensitive to particle loading than in the complete particle transport mode. From the fast fluidized mode, further increases in fluidized gas velocity will raise the rate of upward particle transport, and will sharply reduce the average catalyst density until, at sufficient gas velocity, the particles are moving principally in the complete catalyst transport mode. Thus, there is a continuum in the progression from a fluidized particle bed through fast fluidization and to the pure transport mode. The superficial combustion gas velocity for a fast fluidized flow regime is typically between about 1.5 and about 3.1 m/s (5 and 10 ft/s) and the density is typically between about 48 and about 320 kg/m$^3$ (3 and 20 lb/ft$^3$).

Conversion of gases to reduce $NO_X$ requires suitable temperatures, oxygen levels, and mean residence time. Cyclone inlet horns are usually positioned in the same direction, leading to the formation of streamlines of gas, and some catalyst, in the direction of entrance into the inlet horns. Cyclones are typically positioned at the top of both the bubbling bed regenerator and the upper chamber of a combustor-style regenerator. Streamlines generally follow along the wall of the regenerator. In the upper chamber of a combustor-style regenerator, streamlines start from the disengager and curve outward to the wall then follow the wall around and upwardly to enter through the cyclone inlet horns. The center is relatively stagnant and little overall mixing occurs. Mean residence time for the gases is decreased as a result of the streamlines rather than overall mixing. Temperature and oxygen level concentration differences may result.

SUMMARY OF THE INVENTION

An apparatus and process for increasing mixing in a regenerator. Streamlines of gas and some catalyst may form in a regenerator as a result of cyclone inlet horns positioned in the same direction. Overall mixing in the regenerator may decrease because of these streamlines.

A dampening device may be used to interrupt the streamlines to increase mixing in the regenerator. The dampening device may be a baffle and may direct streamlines from the outside of the chamber toward the center to collide and mix. In another embodiment, a dampening device may be a secondary disengager. The secondary disengager may be positioned above the disengager near the center of an upper chamber of a regenerator. The secondary disengager may be a T-disengager or may have an inverted can arrangement that may discharge gas and catalyst near the center of the upper chamber and interrupt the streamlines. The secondary disengager may increase mixing in the center of the upper chamber. In another embodiment, a dampening device may have swirl arms and may be positioned near the center of the regenerator. Streamlines may enter an inlet in a swirl arm and exit through an outlet facing a direction that directs the streamline counter to the direction of flow.

Such additions to a regenerator may be relatively unobtrusive, inexpensive, and simple for a retrofit or design modification and may result in an improved combustion efficiency at high rates by enhancing the lateral blending of spent and regenerated catalyst, increased lateral mixing of cool, fuel-rich and hot, $O_2$-rich flue gases from opposite sides of the regenerator in the dilute phase. In addition, the mean residence time of flue gas in the dilute phase may result in $NO_X$ reduction.

BRIEF DESCRIPTION OF THE DRAWINGS

FIG. 2 is a cross section view from line 2-2 of FIG. 1.

FIG. 3 is an elevational diagram showing a combustor style regenerator with a secondary disengager dampening device in the form of a T-disengager.

FIG. 4 is an elevational diagram showing a combustor style regenerator with a secondary disengager dampening device with an inverted can arrangement.

DETAILED DESCRIPTION

Figure 1:
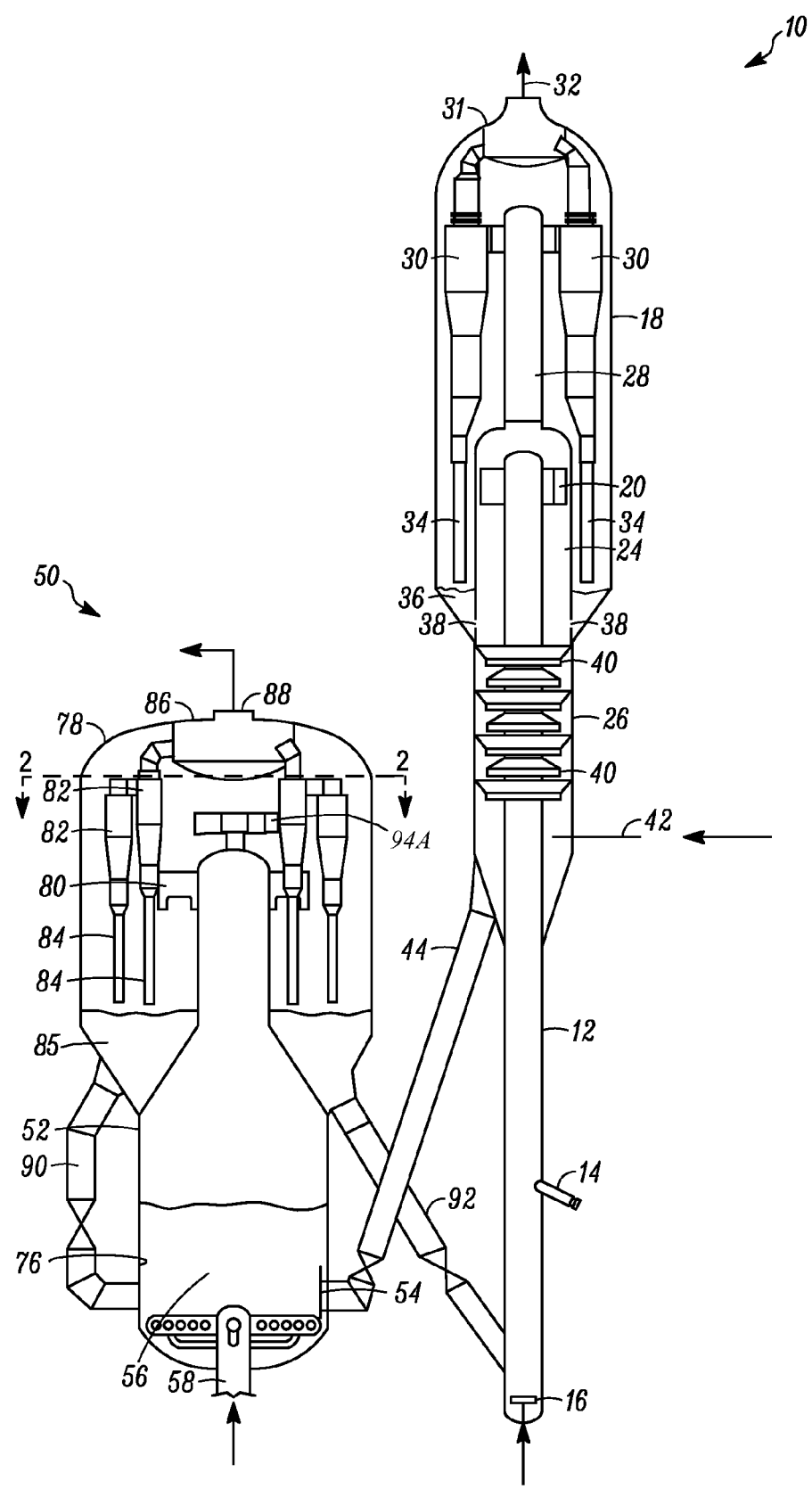
FIG. 1 is an elevational diagram showing a FCC unit with a swirl arm dampening device in a combustor style regenerator.
Figure 5:
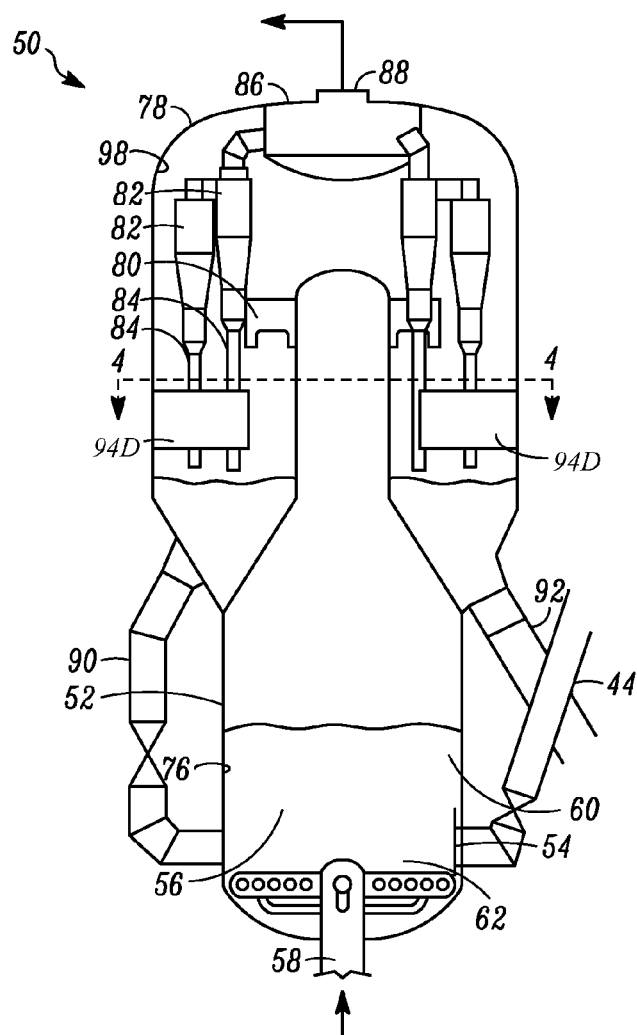
FIG. 5 is an elevational diagram showing a combustor style regenerator with a baffle dampening device.
Figure 6:
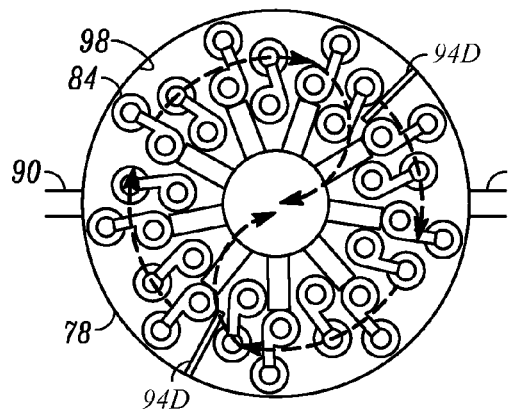
FIG. 6 is a cross section view from line 6-6 of FIG. 5.
Figure 7:
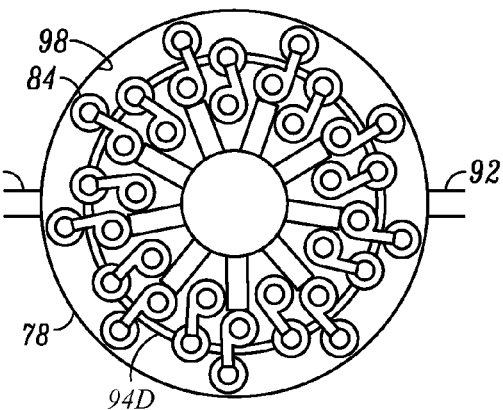
FIG. 7 is a cross section view of a second chamber of a combustor style regenerator with an annular baffle dampening device.

An FCC process may use an FCC unit 10, as shown in FIG. 1. Feedstock enters a riser 12 through a feed distributor 14. Feedstock may be mixed with steam in the feed distributor 14 before entering. Lift gases, which may include inert gases or steam, enters through a steam sparger 16 in the lower portion of the riser 12 and creates a fluidized medium with the catalyst. Feedstock contacts the catalyst to produce cracked hydrocarbon products and spent catalyst. The hydrocarbon products are separated from the spent catalyst in the reactor vessel 18.

The blended catalyst and reacted feed vapors enter the reactor vessel 18 and are separated into a cracked product vapor stream and a collection of catalyst particles covered with substantial quantities of coke and generally referred to as spent catalyst or coked catalyst. Various arrangements of separators to quickly separate coked catalyst from the product stream may be utilized. In particular, a swirl arm arrangement 20, provided at the end of the riser 12, may further enhance initial catalyst and cracked hydrocarbon separation by imparting a tangential velocity to the exiting catalyst and cracked product vapor stream mixture. The swirl arm arrangement 20 is located in an upper portion of a separation chamber 24, and a stripping zone 26 is situated in the lower portion. Catalyst separated by the swirl arm arrangement 20 drops down into the stripping zone 26.

The cracked product comprising cracked hydrocarbons including gasoline and light olefins and some catalyst may exit the separation chamber 24 via a gas conduit 28 in communication with cyclones 30. The cyclones 30 may remove remaining catalyst particles from the product vapor stream to reduce particle concentrations to very low levels. The product vapor stream may enter into a reactor vessel plenum 31 and exit the reactor vessel 18 through a product outlet 32. Catalyst separated by the cyclones 30 returns to the reactor vessel 18 through reactor diplegs 34 and into a dense bed 36 where catalyst passes through chamber openings 38 and enters the stripping zone 26. The stripping zone 26 removes adsorbed hydrocarbons from the surface of the catalyst by countercurrent contact with steam over optional baffles 40. Steam may enter the stripping zone 26 through a line 42. A spent catalyst conduit 44 transfers spent catalyst to a regenerator 50.

The regenerator 50 receives the spent catalyst into a vessel 52, or combustor in a combustor-style regenerator shown in FIGS. 1-7, through an inlet 54. The spent catalyst may enter into a fast fluidized bed 56. A regenerator 50 typically combusts the coke from the surface within the catalyst particles by contact with an oxygen-containing gas. The oxygen-containing gas enters the bottom of the regenerator 50 via a gas distributor 58 and passes through a dense or fast fluidizing bed 56 of catalyst.

Figure 8:
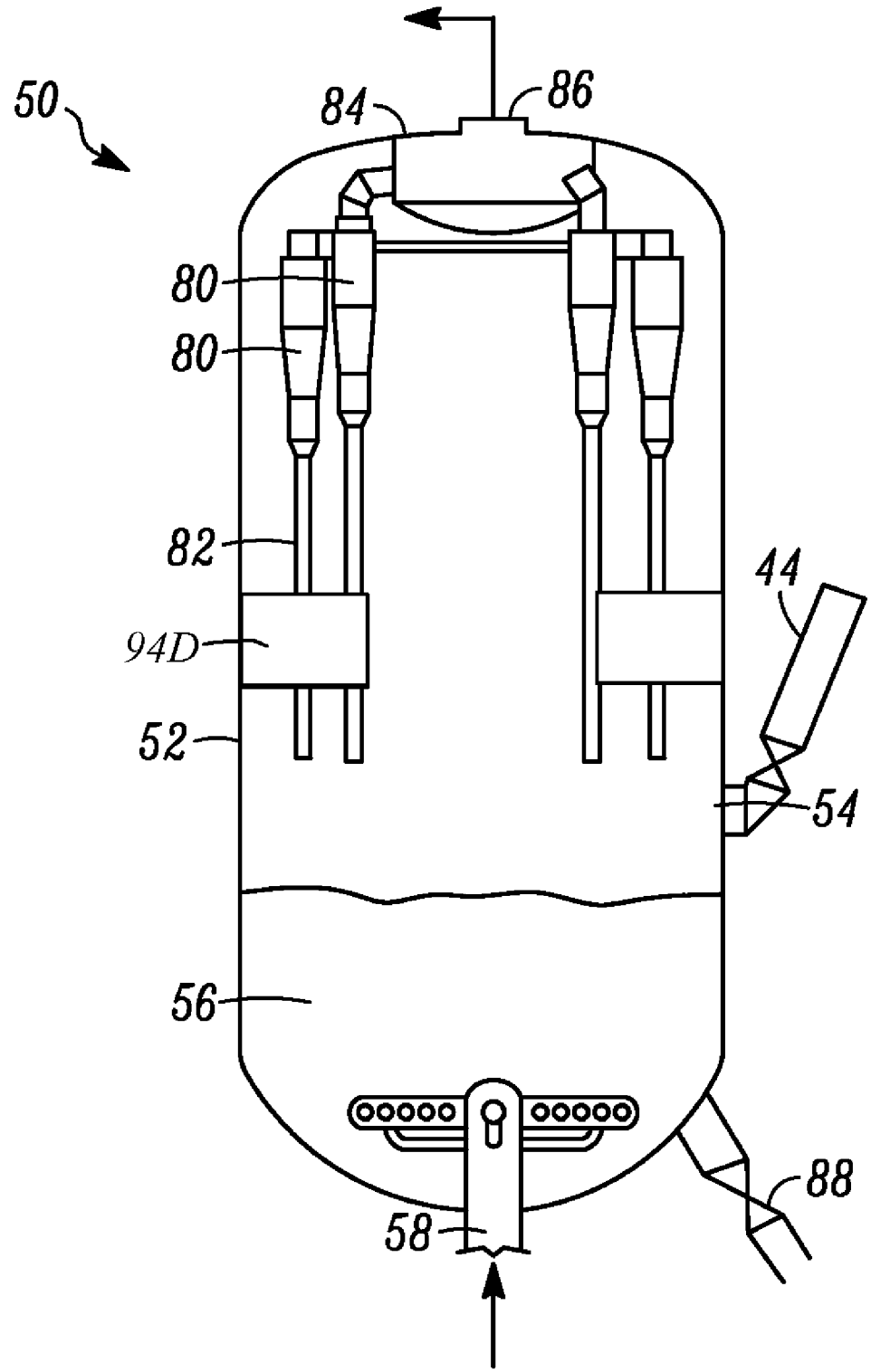
FIG. 8 is an elevational diagram showing a bubbling bed regenerator with a baffle dampening device.

A combustor style regenerator may have an upper chamber 78. As shown in FIG. 8, a bubbling bed regenerator may not have an upper chamber 78 but may have similar components, devices, with similar function as in the upper chamber 78 in the upper section of vessel 52. Increased mixing may be achieved in both types of regenerators 50 and may be accomplished through different embodiments of the invention. Examples provided are mostly for use in a combustor style regenerator 50, however, a bubbling bed regenerator, may also be used for applicable embodiments. As shown in FIG. 1, a disengager 80 may be positioned above the fluidized bed to receive gases and catalyst and initially separate catalyst from flue gas. A regenerator cyclone 82 or other means removes entrained catalyst particles from the rising flue gas and a dipleg 84 may release catalyst. Depending on the size and throughput of a regenerator 50, between about 6 and 60 regenerator diplegs 84 may be arranged in the second chamber 78. Gases may enter a plenum 86, usually near the top of the upper chamber 78 before exiting through a vent 88.

Flue gas consisting primarily of $N_2$, $H_2O$, $O_2$, $CO_2$ and traces of $NO_X$, CO, and $SO_X$ passes upwardly from the dense bed into a dilute phase of the regenerator 50. Combustion of coke from the spent catalyst particles raises the temperatures of the catalyst. The catalyst may pass, regulated by a control valve, through a regenerator standpipe 92, which attaches to the bottom portion of riser 12.

Mixing in the upper chamber 78 may be lacking due to streamlines. Analysis of gas flow through a regenerator indicates high velocities are outside the regenerator cyclones 82, and low velocities in the middle. Hot and cold spots may rotate 45° and 180', respectively, when in the upper regenerator 78. Rotation may be caused by the regenerator cyclones 82 having inlet horns all facing the same direction and all drawing gas from the outer circumference. Cyclone inlets may induce the combustor flue gas to spiral clockwise, when viewed from above looking down. The location of the hot and cold spots would be explained by the hot and cold gas streamlines making ¾, 1 and ½ or more turns as the spiral to cyclone horns without intersecting. By spiraling the gas makes a more gradual turn out of the disengager 80 and with enough turns can enter the regenerator cyclones 82 nearly straight on. The flue gas may also be accelerating to the horn inlet velocity. Mean flue gas residence time for $NO_X$ reduction may be a small fraction, less than 20% of the total space time available in plug flow. Moreover, the hot and cold streamlines never collide. The hypothesized spiraling downward and outward momentum of the disengager arms and outward acceleration of the flue gas may result in a very dead zone in the center of the regenerator and cause the mean flue gas residence time for $NO_X$ reduction to be a small fraction of the total space time available in vertical plug flow. Moreover, the spiraling hot and cold streamlines likely very little mixing.

The locations of the dilute phase temperatures in the upper chamber 78 and afterburn, plenum—catalyst return temperature, the cool and hot spots rotate about 90° counter-clockwise, when viewing downward from above the regenerator 50. The temperature difference from the hot spot to the cool spot also increases to about 20° C. as CO is burned with far less entrained catalyst as heat sink.

A dampening device 94 may increase mixing in a regenerator 50. As shown in FIG. 1, a dampening device 94 may be swirl arms 94A and may be positioned inside the upper chamber 78 to increase mixing. Swirl arms 94A may be attached to the primary disengager 80, which typically has a lower, central position in the second chamber 78. The swirl arms 94A may extend into the center of the chamber, as shown in FIG. 1 and from above in FIG. 2, and may have arms have inlets. Streamlines may enter an inlet in the swirl arm 94A and exit through an outlet facing a direction that directs the streamline counter to the direction of flow. The redirected flow is usually counter to the direction of flow induced by the cyclone inlet horns. Streamlines may collide and induce increased mixing of gas and catalyst.

In FIG. 2, the dashed lines around the side of the upper chamber 78 represent the streamlines flowing in a clockwise direction and then diverting toward the center into the swirl arms 94A and redirected to exit from outlets positioned to release the gas counter to the streamline flow direction. This redirection may disrupt the streamlines and increase mixing. Length of the arms may vary according to the size of the chamber.

As shown in FIGS. 3 and 4, the dampening device 94 may be a secondary disengager and may have an upper outlet. Gas and catalyst exiting from the secondary disengager may cause a different origin for some streamlines that are closer to the center of the chamber 78 and may collide with or redirect the usual streamlines from the disengager 80 to cause a dampening effect. The secondary disengager in FIG. 3 is a secondary T-disengager 94B whereas in FIG. 4 the secondary disengager is an inverted can disengager 94C. An inverted can disengager 94C may have an inverted can or a mushroom cup shape to direct gas and catalyst as it exits from an outlet. Additional modifications to the disengager 80 that may also cause mixing and better utilize the regenerator volume may be having a higher elevation in the regenerator 50. A dampening device 94 may increase the utilization of the less active middle zone of the combustor and increase gas and catalyst loading in the low-velocity center of the regenerator that may improve $NO_X$ and CO reduction at low excess $O_2$ levels with less afterburn.

As shown in FIGS. 5-8, a dampening device 94 may be a baffle 94D. A baffle 94D may be used to increase mixing in the upper chamber 78, or in the upper section of vessel 52 in a bubbling bed regenerator, as shown in FIG. 8. A baffle 94D may be attached to the side wall 98, adjacent to the regenerator diplegs 84 and extend axially, toward the middle of the chamber 78, to at least partly redirect gases and catalyst that normally flow mostly around the edge of the chamber 78. The baffle 94D may have a greater vertical dimension than horizontal, preferably with a height between about 0.6 m (2 feet) and about 3.1 m (10 feet). The baffle 94D may extend toward the center of the upper chamber 78, between sets of regenerator diplegs 84, preferably by between about 0.6 m (2 feet) and about 2.4 m (8 feet). A plurality of baffles 94D may be used and may increase effectiveness. Preferably, two to six baffles 94D are used and may be arranged at different elevations.

In one example, about four baffles 94D may be made of four foot plates of stainless steel of varying widths at two elevations. Baffles 94D may split the streamlines three ways, up, down, and forcing some to the center and cause them to collide with other streamlines. The number and dimensions of plates, however, may be limited so as to not completely stop the general spiral streamlines altogether.

In the dilute phase of the upper regenerator, baffles 94D may be positioned between cyclone 82 sets to divert part of a hot or cold flue gas stream toward the center and mix streamlines of differing composition and temperature, which may improve mixing and increase mean residence time for $NO_X$ and CO reduction. The upper chamber 78 may be able to use the volume more effectively and reduce the magnitude of the hot and cold spots. Improve lateral mixing of combustion gases and increase mean vapor residence time resulting in more uniform dilute phase exotherm, afterburn across the regenerator vessel 52.

Increased mixing may increase mean time in the vessel 52 and lower $NO_X$ emissions. Increased mixing in the upper chamber 78 may be used to provide more even bed, dilute phase and plenum temperature profiles, with reduced and more uniform afterburn at low excess $O_2$. The reduction in excess $O_2$ could add about 5% to coke burn capacity with better utilization of the air while reducing $NO_X$ emissions to very low levels.

Refiners often use high levels of Pt CO combustion promoter and high levels of excess $O_2$ to accelerate combustion and reduce afterburning in their FCC unit, especially when operating at high throughputs. These practices may increase $NO_X$ by up to 10-fold from the 10-30 ppm possible when no platinum is used and excess $O_2$ is controlled below 0.5 v %.

A process for increasing mixing, including lateral mixing, in the upper chamber 78 of a combustor style regenerator 50, as shown in FIGS. 1-7, or in a bubbling bed regenerator 50, as shown in FIG. 8, may include these apparatus. A dampening device or a baffle may be used to increase mixing. Gas and catalyst entering the upper chamber 78 may pass through a disengager 80. Gas and catalyst typically circulate in streams in the chamber 78 and gas may enter a cyclone 80 and pass through a plenum 86 before exiting through a vent 88. This process may occur in the upper section of a bubbling bed regenerator 50 or in a upper chamber 78 of a combustor regenerator 50.

The examples and figures provided are mostly in reference to embodiments used in FCC and RFCC regenerators; however, the invention should not be limited to only the regenerator or to the refining process.

What is claimed is:

1. A regenerator, comprising;
    a vessel having an inlet, a gas distributor, a cyclone, a dampening device positioned in a dilute catalyst phase that redirects flow of gas and catalyst, and an outlet;
    said inlet positioned in said vessel to introduce catalyst;
    said gas distributor positioned below said inlet; and
    said outlet for releasing gas from said vessel.

2. A regenerator as in claim 1, wherein said dampening device is a baffle.

3. A regenerator as in claim 2, wherein said baffle is positioned axially.

4. A regenerator as in claim 2, further comprising a dipleg.

5. A regenerator as in claim 2, wherein said baffle is attached to the wall of said vessel.

6. A regenerator as in claim 5, wherein said baffle extends from said wall and positioned adjacent to said dipleg.

7. A regenerator as in claim 5, wherein said baffle has a vertical height between about 0.6 and about 3 meters.

8. A regenerator as in claim 5, wherein said baffle extends into said vessel between about 0.9 and about 2.4 meters.

9. A regenerator as in claim 2, further comprising a plurality of said baffles.

10. A regenerator as in claim 9, wherein said baffles are positioned at different elevations.

11. A regenerator as in claim 2, wherein said baffle is positioned annularly.

12. A regenerator, comprising;
    a vessel having an inlet, a gas distributor, a cyclone, a dampening device that redirects flow of gas and catalyst, and an outlet;
    said inlet positioned in said vessel to introduce catalyst;
    said gas distributor positioned below said inlet;
    said cyclone positioned to induce a streamline of gas in said vessel;
    said dampening device positioned to dampen said streamline; and
    said outlet releases said gas from said vessel.

13. A regenerator as in claim 12, wherein said vessel has an upper chamber.

14. A regenerator as in claim 12, wherein said cyclone has an inlet horn that induces said streamline of gas.

15. A regenerator as in claim 12, wherein said dampening device has swirl arms.

16. A regenerator as in claim 13, wherein said dampening device is a secondary disengager positioned in said upper chamber.

17. A regenerator as in claim 16, wherein said secondary disengager is a T-disengager.

18. A regenerator as in claim 16, wherein said secondary disengager has an inverted can arrangement.

* * * * *